(12) United States Patent
Piemontesi et al.

(10) Patent No.: US 10,562,990 B2
(45) Date of Patent: *Feb. 18, 2020

(54) CATALYST FOR THE POLYMERIZATION OF OLEFINS

(71) Applicant: BASELL POLIOLEFINE ITALIA S.R.L., Milan (IT)

(72) Inventors: Fabrizio Piemontesi, Ferrara (IT); Gianni Vitale, Ferrara (IT); Dario Liguori, Ferrara (IT); Giampiero Morini, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 5 days.

This patent is subject to a terminal disclaimer.

(21) Appl. No.: 15/759,143

(22) PCT Filed: Aug. 30, 2016

(86) PCT No.: PCT/EP2016/070389
§ 371 (c)(1),
(2) Date: Mar. 9, 2018

(87) PCT Pub. No.: WO2017/042054
PCT Pub. Date: Mar. 16, 2017

(65) Prior Publication Data
US 2019/0055330 A1 Feb. 21, 2019

(30) Foreign Application Priority Data

Sep. 10, 2015 (EP) .................................. 15184570

(51) Int. Cl.
| | | |
|---|---|---|
| *B01J 23/18* | (2006.01) | |
| *C08F 4/20* | (2006.01) | |
| *C08F 4/18* | (2006.01) | |
| *B01J 21/06* | (2006.01) | |
| *C08F 10/06* | (2006.01) | |

(52) U.S. Cl.
CPC .............. *C08F 10/06* (2013.01); *B01J 21/06* (2013.01); *B01J 23/18* (2013.01); *C08F 4/18* (2013.01); *C08F 4/20* (2013.01); *C08F 2800/20* (2013.01)

(58) Field of Classification Search
None
See application file for complete search history.

(56) References Cited

U.S. PATENT DOCUMENTS

| | | | | | |
|---|---|---|---|---|---|
| 4,395,360 | A | * | 7/1983 | Albizatti | C08F 10/00 502/112 |
| 6,127,303 | A | * | 10/2000 | Ebara | C08F 4/6465 502/125 |
| 9,676,883 | B2 | * | 6/2017 | Piemontesi | C08F 210/06 |
| 10,113,012 | B2 | * | 10/2018 | Guidotti | C08F 4/64 |
| 2016/0347881 | A1 | * | 12/2016 | Patil | C08F 110/02 |
| 2017/0066851 | A1 | * | 3/2017 | Guidotti | C08F 4/64 |
| 2017/0073444 | A1 | * | 3/2017 | Piemontesi | C08F 210/06 |
| 2018/0030177 | A1 | * | 2/2018 | Reimers | C08F 210/06 |

FOREIGN PATENT DOCUMENTS

| | | |
|---|---|---|
| DE | 2818642 A1 | 11/1978 |
| WO | 2015135903 A1 | 9/2015 |
| WO | 2015169831 A1 | 11/2015 |

OTHER PUBLICATIONS

International Search Report and Written Opinon dated Nov. 7, 2016 (Nov. 7, 2016) for Corresponding PCT/EP2016/070389.

* cited by examiner

*Primary Examiner* — Richard A Huhn

(57) ABSTRACT

A catalyst for the homopolymerization or copolymerization of $CH_2$=CHR olefins, made from or containing the product obtained by contacting:
(i) a solid catalyst component made from or containing Ti, Mg, Cl, and an internal electron donor compound, wherein the solid catalyst component contains from about 0.1 to about 50 wt % of Bi, based upon the total weight of the solid catalyst component;
(ii) an alkyl aluminum compound and,
(iii) an external electron donor compound having the formula:

(R1)$a$Si(OR2)$b$ wherein $R^1$ and $R^2$ are independently selected from the group consisting of alkyl radicals with 1-8 carbon atoms and a is 0 or 1 and a+b=4.

13 Claims, No Drawings

CATALYST FOR THE POLYMERIZATION OF OLEFINS

This application is the U.S. National Phase of PCT International Application PCT/EP2016/070389, filed Aug. 30, 2016, claiming benefit of priority to European Patent Application No. 15184570.8, filed Sep. 10, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a catalyst for the homopolymerization or copolymerization of olefins made from or containing a solid catalyst component made from or containing Mg, Bi, Ti, and halogen elements, and an internal electron donor compound, an alkyl aluminum compound as cocatalyst and an external donor compound having specific chemical structure as well as the use of the catalyst in related polymerization processes.

BACKGROUND OF THE INVENTION

Catalyst components for the polymerization of olefins include Ziegler-Natta category components. In a first instance, a Ziegler-Natta catalyst system was based on the use of solid $TiCl_3$ obtained by reduction of $TiCl_4$ with aluminum alkyls. Because of the insufficient activity and stereospecificity of the catalysts, the resulting polymer were subjected to a de-ashing treatment to remove the catalyst residues and a washing step to remove any atactic polymer. Presently and in some instances, the Ziegler-Natta catalysts that are used industrially are made from or contain a solid catalyst component, constituted by a magnesium dihalide on which are supported a titanium compound and optionally an internal electron donor compound, used in combination with an Al-alkyl compound.

In some instances, when ZN catalysts are used for propylene polymerization, the catalysts contain an internal donor. In further instances, the ZN catalysts are used with an external donor to obtain higher isotacticity. Examples of internal donors are esters of phthalic acid, including diisobutylphthalate. In some instances, phthalates are used as internal donors in combination with alkylalkoxysilanes as external donors. It is desirable to increase the intrinsic capability of the solid catalyst components to produce stereoregular polymers, thereby allowing the use of less stereoregulating internal or external donors.

It is also desirable to produce stereoregular polymers which maintain a high isotacticity while having high melt flow rate and a narrower molecular weight distribution.

It is also desirable to provide a catalyst system with improved stereospecificity while maintaining a high hydrogen response.

SUMMARY OF THE INVENTION

In a general embodiment, the present disclosure provides a catalyst for the homopolymerization or copolymerization of $CH_2$=CHR olefins, wherein R is a hydrocarbyl radical with 1-12 carbon atoms, made from or containing (A) the product obtained by contacting:
(i) a solid catalyst component made from or containing (a) Ti, (b) Mg, (c) Cl, and (d) an internal electron donor compound selected from the group consisting of ethers, amines, silanes, carbamates ketones, esters of aliphatic acids, alkyl and aryl esters of optionally substituted aromatic polycarboxylic acids, diol derivatives selected from the group consisting of monoesters monocarbamates and monoesters monocarbonates and mixtures thereof, wherein the solid catalyst component is made from or contains (e) from about 0.1 to about 50 wt % of Bi, based upon the total weight of the solid catalyst component;
(ii) an alkylaluminum compound and,
(iii) an external electron donor compound having the formula:

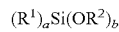

wherein $R^1$ and $R^2$ are independently selected from the group consisting of alkyl radicals with 1-8 carbon atoms, optionally containing heteroatoms, and a is 0 or 1 and a+b=4.

The catalyst of the present disclosure can be used for the homopolymerization or copolymerization of $CH_2$=CHR olefins, in which R is a hydrocarbyl radical with 1-12 carbon atoms, optionally in mixture with ethylene. In some embodiments, the $CH_2$=CHR olefin is propylene.

In a general embodiment, the present disclosure provides a process for the homopolymerization or copolymerization of olefins $CH_2$=CHR, in which R is a hydrocarbyl radical with 1-12 carbon atoms, optionally in mixture with ethylene, carried out in the presence of the catalyst.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the following detailed description is to be regarded as illustrative in nature and not restrictive.

DETAILED DESCRIPTION OF THE INVENTION

As used herein, the term "alkyl" refers to a linear or branched univalent group having general formula $C_nH_{2n+1}$ in which n is an integer number.

As used herein, the term "substituted" referred to a group wherein a hydrogen atom has been replaced by a heteroatom.

As used herein, the term "heteroatom" refers to an atom which is not carbon or hydrogen. In some embodiments, heteroatoms are selected from the group consisting of halogen, Si, N, O and P.

As used herein, the term "aryl" refers to a group wherein at least five carbon atoms are linked to form an aromatic ring optionally bearing hydrocarbon substituents that can be joined to form cyclic structures.

In some embodiments, in the solid catalyst component (i) the content of Bi ranges from about 0.5 to about 40 wt %, alternatively from about 0.5 to about 35, alternatively from about 0.5 to about 20, alternatively from about 1 to about 20% wt. In some embodiments, the content of Bi ranges from about 1 to about 35 wt %, alternatively from about 2 to about 25 wt %, alternatively from about 2 to about 20 wt %.

In some embodiments, the Bi atoms derive from one or more Bi compounds not having Bi-carbon bonds. In some embodiments, the Bi compounds are selected from the group consisting of Bi halides, Bi carbonate, Bi acetate, Bi nitrate, Bi oxide, Bi sulphate, and Bi sulfide. In some embodiments, the Bi compounds have the valence +3. In some embodiments, the Bi compounds are selected from the group consisting of Bi trichloride and Bi tribromide. In some embodiments, the Bi compound is BiCl$_3$.

In some embodiments, the particles of the solid catalyst component have substantially spherical morphology and average diameter ranging between about 5 and about 150 μm, alternatively from about 20 to about 100 μm, alternatively from about 30 to about 90 μm. In the present description, the term "substantially spherical morphology" as used herein refers to particles having the ratio between the greater axis and the smaller axis equal to or lower than about 1.5, alternatively lower than about 1.3.

In some embodiments, the amount of Mg in the solid catalyst component (i) ranges from about 8 to about 30 wt %, alternatively from about 10 to about 25 wt %, based upon the total weight of the solid catalyst component.

In some embodiments, the amount of Ti in the solid catalyst component (i) ranges from about 0.5 to about 5 wt %, alternatively from about 0.7 to about 3 wt %, based upon the total weight of the solid catalyst component.

In some embodiments, the Mg/Ti molar ratio is higher than the corresponding ratio of the catalyst not containing Bi.

In some embodiments, the titanium atoms derive from titanium compounds of formula $Ti(OR^3)_n X_{4-n}$, wherein n is between 0 and 4; X is halogen and $R^3$ is a hydrocarbon radical. In some embodiments, $R^3$ is an alkyl radical having 1-10 carbon atoms or a COR group. In some embodiments, the titanium compounds have a Ti-halogen bond such as titanium tetrahalides or halogenalcoholates. In some embodiments, the titanium compounds are selected from the group consisting of TiCl$_4$, and Ti(OEt)Cl$_3$.

In some embodiments, the internal electron donor in the solid catalyst component (i) is selected from group consisting of ethers, amines, silanes, carbamates ketones, esters of aliphatic acids, alkyl and aryl esters of optionally substituted aromatic polycarboxylic acids, diol derivatives selected from the group consisting of monoesters monocarbamates and monoesters monocarbonates and mixtures thereof.

In some embodiments, the internal donor is selected from alkyl and aryl esters of optionally substituted aromatic polycarboxylic acids. In some embodiments, the internal donors are esters of phthalic acids. In some embodiments, the internal donors are esters of aliphatic acids selected from the group consisting of malonic, glutaric, maleic and succinic acids. In some embodiments, the internal donors are selected from the group consisting of n-butylphthalate, di-isobutylphthalate (DIBP), and di-n-octylphthalate.

In some embodiments, the internal donor is selected from the group consisting of 1,3 diethers of the formula:

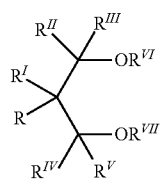

(I)

wherein R, $R^I$, $R^{II}$, $R^{III}$, $R^{IV}$ and $R^V$ equal to or different from each other, are hydrogen or hydrocarbon radicals having from 1 to 18 carbon atoms, and $R^{VI}$ and $R^{VII}$, equal to or different from each other, have the same meaning of R-$R^V$ except that $R^{VI}$ and $R^{VII}$ cannot be hydrogen; one or more of the R-$R^{VII}$ groups can be linked to form a cycle. In some embodiments, the 1,3-diethers have $R^{VI}$ and $R^{VII}$ selected from $C_1$-$C_4$ alkyl radicals.

In some embodiments, the internal donor is a mixture of donors. In some embodiments, the mixture includes mixtures of esters of succinic acids and 1,3 diethers as disclosed in Patent Cooperation Treaty Publication No. WO2011/061134, incorporated herein by reference.

In some embodiments, the internal electron donor is selected from the group consisting of monofunctional donors, thereby distributing an olefin comonomer within a polymer chain. In some embodiments, the monofunctional donors are selected from the group consisting of ethers and $C_1$-$C_4$ alkyl esters of aliphatic mono carboxylic acids. In some embodiments, the ethers are selected from the group consisting of $C_2$-$C_{20}$ aliphatic ethers, alternatively cyclic ethers. In some embodiments, the cyclic ethers have 3-5 carbon atoms, such as tetrahydrofurane and dioxane. In some embodiments, the esters are selected from the group consisting of ethylacetate and methyl formiate.

In some embodiments, the final amount of internal electron donor compound in the solid catalyst component (i) ranges from about 0.5 to about 40 wt %, alternatively from about 1 to about 35 wt %.

In some embodiments, the donor belongs to alkyl and aryl esters of optionally substituted aromatic polycarboxylic acids and the Mg/Ti molar ratio is equal to, or higher than, about 13, alternatively in the range from about 14 to about 40, alternatively from about 15 to about 40. In some embodiments, the Mg/internal donor molar ratio is higher than about 16, alternatively higher than about 17, alternatively ranging from about 18 to about 50. In some embodiments, the alkyl and aryl esters are phthalates.

In some embodiments, the internal electron donor belongs to diethers of formula (I), the Mg/Ti molar ratio is higher than about 6, alternatively higher than about 7, and the Mg/internal donor molar ratio ranges from about 9 to about 20, alternatively from about 10 to about 20.

In some embodiments, the components for preparing the solid catalyst component (i) of the magnesium dichloride in an anhydrous state, the titanium compound, the Bi compound and the internal electron donor compounds are milled together under conditions in which activation of the magnesium dichloride occurs. In some embodiments, the resulting product is treated one or more times with an excess of TiCl$_4$ at a temperature between about 80 and about 135° C. This treatment is followed by washings with hydrocarbon solvents until chloride ions are not detectable. In some embodiments, the product is treated with halogenated hydrocarbons such as 1,2-dichloroethane, chlorobenzene, or dichloromethane. The treatment is carried out for a time between about 1 to about 4 hours and at temperature of from about 40° C. to the boiling point of the halogenated hydrocarbon. In some embodiments, any Bi compound can be used. In some embodiments, BiCl$_3$ is the Bi compound. In some embodiments, the final amount of Bi is in the range from about 0.1 to about 50% by weight.

In some embodiments, the solid catalyst component (i) is prepared by reacting a titanium compound of formula $Ti(OR)_{q-y}X_y$, where q is the valence of titanium and y is a number between 1 and q, with a magnesium chloride deriving from an adduct of formula $MgCl_2 \cdot pR^4OH$, where p is a number between about 0.1 and about 6, alternatively from about 2 to about 3.5, and $R^4$ is a hydrocarbon radical having 1-18 carbon atoms. In some embodiments, the titanium compound is TiCl$_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct thereby creating an emulsion which is quickly quenched causing the solidification of the adduct in form of spherical particles. In some embodiments, the procedure for the preparation of the spherical adducts are as disclosed in U.S. Pat. Nos. 4,399,054 and 4,469,648, both incorporated herein by reference. In some embodiments, the adduct is directly reacted with Ti compound or subjected to thermal controlled dealcoholation (80-130° C.), thereby obtaining an adduct in which the number of moles of alcohol is lower than about 3, alternatively between about 0.1 and about 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the temperature of the cold $TiCl_4$ is about 0° C. In some embodiments, the treatment with $TiCl_4$ is carried out one or more times. In some embodiments, the electron donor compound is added during the treatment with $TiCl_4$. In some embodiments, the electron donor compound is added as a fresh reactant to the solid intermediate catalyst component obtained by a reaction between the adduct and the Ti compound, as disclosed in Patent Cooperation Treaty Publication No. WO2004/106388, incorporated herein by reference.

In some embodiments, the Bi compound is incorporated directly into the $MgCl_2 \cdot pR^4OH$ adduct during the adduct's preparation. In some embodiments, the Bi compound is added at the initial stage of adduct preparation by mixing the Bi compound together with $MgCl_2$ and the alcohol. In some embodiments, the Bi compound is added to the molten adduct before the emulsification step.

The amount of Bi introduced ranges from about 0.1 to about 1 mole per mole of Mg in the adduct. In some embodiments, the Bi compounds which are incorporated directly into the $MgCl_2 \cdot pR^4OH$ adduct are Bi halides. In some embodiments, the Bi compound is $BiCl_3$.

In some embodiments, the solid catalyst component (i) is made from or contains a Lewis base adduct made from or containing $MgCl_2$, an alcohol $R^5OH$ in which $R^5$ is a $C_1$-$C_{10}$ alkyl group, present in a molar ratio with $MgCl_2$ ranging from about 0.1 to about 6 and a Bi compound in an amount such that the Bi atoms range from about 0.1 to about 1 mole per mole of Mg. In some embodiment, the Bi compounds are Bi halides. In some embodiment, the Bi compound is $BiCl_3$.

In some embodiments, the preparation of solid catalyst components (i) in spherical form occurs as described in European Patent Application No. EP-A-395083, Patent Cooperation Treaty Publication No. WO98/44009, or Patent Cooperation Treaty Publication No. WO02/051544, all incorporated herein by reference.

In some embodiments, the solid catalyst components show a surface area (by B.E.T. method) between about 20 and about 500 $m^2/g$, alternatively between about 50 and about 400 $m^2/g$, and a total porosity (by B.E.T. method) higher than about 0.2 $cm^3/g$, alternatively between about 0.3 and about 0.6 $cm^3/g$. In some embodiments, the porosity (Hg method) due to pores with radius up to about 10.000 Å ranges from about 0.3 to about 1.5 $cm^3/g$, alternatively from about 0.45 to about 1 $cm^3/g$.

In some embodiments, the solid catalyst component has an average particle size ranging from about 5 to about 120 μm, alternatively from about 10 to about 100 μm.

In some embodiments, the internal electron donor compounds are obtained in situ by using a precursor transformed by chemical reactions such as etherification, alkylation, esterification, and transesterification.

In some embodiments, the solid catalyst component (i) is converted into catalysts for the polymerization of olefins by reacting the solid catalyst component (i) with the alkylaluminum compound (ii) and an external electron donor (iii).

In some embodiments, the alkyl-Al compound (ii) is selected from the group consisting of trialkyl aluminum compounds, alkylaluminum halides, alkylaluminum hydrides and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichlorides selected from the group consisting of $AlEt_2Cl$ and $Al_2Et_3Cl_3$. In some embodiments, the alkyl-Al compound (ii) is a mixture including trialkylaluminums.

In some embodiments, the Al/Ti ratio is higher than about 1, alternatively between about 50 to about 500.

In some embodiments, the external electron donor compound (iii) is a silicon compound having the formula

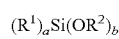

wherein $R^1$ and $R^2$ are independently selected among alkyl radicals with 1-8 carbon atoms, optionally containing heteroatoms, wherein a is 0 or 1 and a+b=4.

In some embodiments, a is 0 and $R^2$ groups are independently selected from the group consisting of alkyl radicals having 2-6 carbon atoms, alternatively 2-4 carbon atoms.

In some embodiments, the external electron donor compound (iii) have a is 1, b is 3 and $R^1$ and $R^2$ are independently selected from the group consisting of alkyl radicals having 2-6 carbon atoms, alternatively 2-4 carbon atoms. In some embodiments, the external electron donor compound (iii) is isobutyl triethoxysilane (iBTES).

In some embodiments, the external electron donor compound (iii) have a is 0, b is 4 and $R^2$ are independently selected from the group consisting of alkyl radicals with 2-6 carbon atoms, alternatively 2-4 carbon atoms. In some embodiments, the external electron donor compound (iii) is tetraethoxysilane.

In some embodiments, the external electron donor compound (iii) is used in an amount to give a molar ratio between the alkylaluminum compound (ii) and the external electron donor compound (iii) of from about 0.1 to about 200, alternatively from about 1 to about 100 and alternatively from about 3 to about 50.

In a general embodiment, the present disclosure provides a catalyst for the homopolymerization or copolymerization of $CH_2$=CHR olefins, in which R is a hydrocarbyl radical with 1-12 carbon atoms optionally in mixture with ethylene. In some embodiments, the $CH_2$=CHR olefins is propylene.

In a general embodiment, the present disclosure provides a process for the homopolymerization or copolymerization of olefins $CH_2$=CHR, in which R is a hydrocarbyl radical with 1-12 carbon atoms, optionally in mixture with ethylene, carried out in the presence of the catalyst.

In some embodiments, the $CH_2$=CHR olefin is propylene, the process produces propylene homopolymers or propylene copolymers with a comonomer of ethylene or olefin $CH_2$=CHR different from propylene, wherein the propylene copolymers are made from or contains up to about 40 wt % of ethylene or olefin $CH_2$=CHR other than propylene, alternatively up to about 20 wt %.

In some embodiments, the process is carried out in the presence of a hydrogen feed. Hydrogen is used as a molecular weight regulator.

In some embodiments, the polymerization process is carried out in slurry polymerization using, as diluent, an inert hydrocarbon solvent, or bulk polymerization using the liquid monomer as a reaction medium. In some embodiments, the liquid monomer is propylene. In some embodiments, the polymerization process occurs in gas-phase operating in one or more fluidized or mechanically agitated bed reactors. In some embodiments, the process is carried out in a sequential multistage polymerization process in which the same or different polymerization techniques are used.

In some embodiments, the polymerization temperature ranges from about 20 to about 120° C., alternatively from about 40 to about 80° C. In some embodiments, when the polymerization is carried out in gas-phase, the operating pressure is between about 0.5 to about 5 MPa, alternatively between about 1 and about 4 MPa. In some embodiments, when the polymerization is carried out in bulk polymerization, the operating pressure ranges between about 1 to about 8 MPa, alternatively between about 1.5 to about 5 MPa.

In a general embodiment, the catalyst system of the present disclosure produces a polyolefin with high melt flow rate and an increased stereospecificity as compared with catalysts prepared under the same conditions but not including Bi atoms. In some embodiments, the polyolefin is a propylene polymer. In some embodiments, the polymers produced with the catalyst system show a narrower molecular weight distribution compared to polymers obtained with the catalyst system not containing Bi.

In some embodiments, the catalyst produces polypropylene with an isotacticity, expressed in terms of xylene insolubility, of at least about 97% in correspondence with melt flow rate of at least about 50 g/10 minutes.

The following examples are given in order to better illustrate the disclosure without limiting it.

EXAMPLES

Characterizations
Determination of Mg, Ti

The determination of Mg and Ti content in the solid catalyst component was carried out via inductively coupled plasma emission spectroscopy on "I.C.P Spectrometer ARL Accuris". The sample was prepared by analytically weighing, in a "Fluxy" platinum crucible", 0.1÷0.3 grams of catalyst and 2 grams of lithium metaborate/tetraborate 1/1 mixture. After addition of some drops of KI solution, the crucible was inserted in a "Claisse Fluxy" for the complete burning. The residue was collected with a 5% v/v $HNO_3$ solution and then analyzed via ICP at the following wavelengths: Magnesium, 279.08 nm and Titanium, 368.52 nm.

Determination of Bi

The determination of Bi content in the solid catalyst component was carried out via inductively coupled plasma emission spectroscopy on "I.C.P Spectrometer ARL Accuris".

The sample was prepared by analytically weighing in a 200 cm³ volumetric flask 0.1÷0.3 grams of catalyst. After slow addition of both about 10 milliliters of 65% v/v $HNO_3$ solution and about 50 cm³ of distilled water, the sample underwent a digestion for 4÷6 hours. Then the volumetric flask was diluted to the mark with deionized water. The resulting solution was directly analyzed via ICP at the following wavelength: Bismuth, 223.06 nm.

Determination of Internal Donor Content

The determination of the content of internal donor in the solid catalytic compound was done through gas chromatography. The solid component was dissolved in acetone, an internal standard was added, and a sample of the organic phase was analyzed in a gas chromatograph, to determine the amount of donor present at the starting catalyst compound.

Determination of X.I.

In a round-bottomed flask provided with a cooler and a reflux condenser, 2.5 g of polymer and 250 ml of o-xylene were placed and kept under nitrogen. The mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction was expressed as a percentage of the original 2.5 grams and then, by difference, the X.I. %.

Molecular Weight Distribution (Mw/Mn)

Molecular weights and molecular weight distribution were measured at 150° C. using a Waters Alliance GPCV/2000 instrument equipped with four mixed-bed columns PLgel Olexis having a particle size of 13 μm. The dimensions of the columns were 300×7.8 mm. The mobile phase used was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol were added. 300 μl (nominal value) of solution were injected into the column set. A calibration curve was obtained using 10 polystyrene standard samples (Easi-Cal kit by Agilent) with molecular weights in the range from 580 to 7 500 000. It was assumed that the K values of the Mark-Houwink relationship were:

$K=1.21\times10^{-4}$ dl/g and $\alpha=0.706$ for the polystyrene standards, $K=1.90\times10^{-4}$ dl/g and $\alpha=0.725$ for the experimental samples.

A third order polynomial fit was used to interpolate the experimental data and obtain the calibration curve. Data acquisition and processing was done by using Waters Empowers 3 Chromatography Data Software with GPC option.

Melt Flow Rate (MFR)

The melt flow rate MFR of the polymer was determined according to ISO 1133 (230° C., 2.16 Kg).

Polymer Microstructure Analysis

The analysis was carried out on xylene insoluble fractions. About 40 mg of polymer were dissolved in 0.5 ml of 1,1,2,2-tetrachloroethane-d2. 13C-NMR spectra were acquired at 120° C. on a Bruker AV-600 spectrometer equipped with cryoprobe, operating at 150.91 MHz in the Fourier transform mode. A 90° pulse, 15 seconds of delay between pulses and Composite Pulse Decoupling (CPD, bi_WALTZ_65_64pl sequence) to remove 1H-13C coupling were used. About 512 transients were stored in 64K data points with a spectral window of 9000 Hz. The peak of mmmm pentad in the methyl region at 21.80 ppm was used as an internal reference. The tacticity was evaluated from integrals of pentads in the methyl region using the microstructure analysis described in "Studies of the stereospecific polymerization mechanism of propylene by a modified Ziegler-Natta catalyst based on 125 MHz 13C n.m.r. spectra" Y. Inoue, Y. Itabashi, and R. Chûjô, 25 Polymer 1640 (1984) (hereinafter, Y. Inoue, et al.), and "Two-site model analysis of $^{13}C$ NMR. of polypropylene polymerized by Ziegler-Natta catalyst with external alkoxysilane donors" R. Chûjô, Y. Kogure, and T. Väänänen, 35 Polymer 339 (1994) (hereinafter, R. Chûjô, et al.), both incorporated herein by reference. The experimental pentad distribution was fitted using the two-site model described in R. Chûjô, et al. In Table 2, the mmmm pentad of the portion of polymer generated from the "asymmetric bernoullian site" defined according to R. Chûjô, et al. is reported.

Composition of Ethylene/Propylene Copolymers Via $^{13}$C NMR Analysis $^{13}$C NMR spectra were acquired on a Bruker AV-600 spectrometer equipped with cryoprobe, operating at 160.91 MHz in the Fourier transform mode at 120° C.

The peak of the methyl carbon in mmmm pentad was used as an internal reference at 21.8 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD (Composite Programmed Decoupling) to remove $^1$H-$^{13}$C coupling. About 512 transients were stored in 32K data points using a spectral window of 9000 Hz.

The assignments of the spectra were made as described in M. Kakugo, Y. Naito, K. Mizunuma and T. Miyatake 15 Macromolecules 1150 (1982), incorporated herein by reference. The evaluation of triad distribution was evaluated using the following relations:

| | | |
|---|---|---|
| PPP = 100 × [T$_{\beta\beta}$]/S | PPE = 100 × [T$_{\beta\delta}$]/S | EPE = 100 × [T$_{\delta\delta}$]/S |
| PEP = 100 × [S$_{\beta\beta}$]/S | PEE = 100 × [S$_{\beta\delta}$]/S | EEE = 100 × (0.25 [S$_{\gamma\delta}$] + 0.5 [S$_{\delta\delta}$])/S | wherein S=([T$_{\beta\beta}$]+[T$_{\beta\delta}$]+[T$_{\delta\delta}$]+[S$_{\beta\beta}$]+[S$_{\beta\delta}$]+0.25 [S$_{\gamma\delta}$]+ 0.5 [S$_{\delta\delta}$]) and [T$_{\beta\beta}$], [T$_{\beta\delta}$], [T$_{\delta\delta}$], [S$_{\beta\beta}$], [S$_{\beta\delta}$], [S$_{\gamma\delta}$] and [S$_{\delta\delta}$] are the integrals of the peak regions corresponding to the specific carbon atom. The nomenclature is as described in C. J. Carman, R. A. Harrington and C. E. Wilkes 10 Macromolecules 536 (1977), incorporated herein by reference.

The copolymer composition was obtained from triad distribution as: Ethylene (mol %)=EEE+PEE+PEP. The ethylene wt % was then calculated from the molar composition.

Procedure for the Preparation of the Spherical Adduct

Microspheroidal MgCl$_2$.pC$_2$H$_5$OH adduct was prepared according to the method described in Example 2 of Patent Cooperation Treaty No. WO98/44009, incorporated herein by reference with the difference that BiCl$_3$ in a powder form and in the amount indicated in Table 1 added in the step of molten MgCl$_2$-EtOH adduct preparation. Containing 57% of ethanol, the solid spherical particles underwent a dealcoholation step under warm nitrogen flow until the level of ethanol reached 50 wt %.

Procedure for the Preparation of the Phthalate-Based Solid Catalyst Component

Into a 500 ml round bottom flask, equipped with a mechanical stirrer, cooler and thermometer, 300 ml of TiCl$_4$ were introduced at room temperature under nitrogen atmosphere. After cooling to 0° C., while stirring, diisobutylphthalate and 15.0 g of the spherical adduct were sequentially added into the flask. The amount of charged internal donor was such to meet a Mg/donor molar ratio of 8. The temperature was raised to 100° C. and maintained for 1 hour. Thereafter, stirring was stopped, the solid product was allowed to settle and the supernatant liquid was siphoned off at 100° C. After the supernatant was removed, additional fresh TiCl$_4$ was added to reach the initial liquid volume again. The mixture was then heated at 120° C. and kept at this temperature for 30 minutes. Stirring was stopped again, the solid was allowed to settle and the supernatant liquid was siphoned off. The treatment with TiCl$_4$ at 120° C. was repeated with the mixture kept at temperature for 15 minutes. After removal of the liquid phase the solid was washed with anhydrous heptane six times in temperature gradient down to 60° C. and one time at room temperature. The solid was then dried under vacuum and analyzed.

Procedure for the Preparation of the Glutarate-Based Solid Catalyst Component

Into a 500 ml round bottom flask, equipped with a mechanical stirrer, cooler and thermometer, 300 ml of TiCl$_4$ were introduced at room temperature under nitrogen atmosphere. After cooling to 0° C., while stirring, 0.61 g of BiCl$_3$ in a powder form and 15.0 g of the spherical adduct were sequentially added into the flask. The temperature was raised to 40° C. and 1.5 g of diethyl 3,3-dipropylglutarate were added at this temperature. The amount of internal donor was such to meet a Mg/donor molar ratio of 14. The temperature was raised to 120° C. and maintained for 1 hour. Thereafter, stirring was stopped, the solid product was allowed to settle, and the supernatant liquid was siphoned off at 120° C. After the liquid was removed, additional 300 mL of fresh TiCl$_4$ and 1.5 g of diethyl 3,3-dipropylglutarate were added. The mixture was then re-heated at 120° C. and kept at this temperature for 30 minutes under stirring. Stirring was stopped again, the solid was allowed to settle and the supernatant liquid was siphoned off at 120° C. After the liquid was removed, additional 300 ml of fresh TiCl$_4$ was added. The mixture was then heated at 120° C. and kept at this temperature for 15 minutes under stirring. Stirring was stopped again, the solid was allowed to settle and the supernatant liquid was siphoned off at 120° C. The solid was washed with anhydrous heptane four times at 90° C. and one time with i-hexane at 25° C. The solid was then dried under vacuum and analyzed.

General Procedure for the Polymerization of Propylene

A 4-liter steel autoclave equipped with a stirrer, pressure gauge, thermometer, catalyst feeding system, monomer feeding lines and thermostating jacket, was purged with nitrogen flow at 70° C. for one hour. A suspension containing 75 ml of anhydrous hexane, 0.76 g of AlEt$_3$ (6.66 mmol), 0.33 mmol of external donor and 0.006÷0.010 g of solid catalyst component, precontacted for 5 minutes, was charged. Tetraethoxysilane (TEOS), iso-butyl-triethoxysilane (iBTES) or n-propyl trimethoxysilane (n-PTMS) was used as an external donor as specified in Table 2.

The autoclave was closed and hydrogen was added. Then, under stirring, 1.2 kg of liquid propylene was fed. The temperature was raised to 70° C. in about 10 minutes and the polymerization was carried out at this temperature for 2 hours. At the end of the polymerization, the non-reacted propylene was removed; the polymer was recovered and dried at 70° C. under vacuum for 3 hours. Then the polymer was weighed and characterized.

General Procedure for the Copolymerization of Ethylene and Propylene

A 4-liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow (0.5 bar), a suspension containing 75 ml of anhydrous hexane, 0.76 g of AlEt$_3$, 0.33 mmol of external donor and 0.004÷0.010 g of solid catalyst component, precontacted for 5 minutes, was charged. The autoclave was closed; subsequently the amount of hydrogen reported in Table 3 was added. Then, under stirring, 1.2 kg of liquid propylene with 5 g ethylene was fed in about 10-15 minutes while raising the temperature from 30° C. to 70° C. The polymerization was carried out at 70° C. for two hours and ethylene was continuously fed in order to keep the pressure constant. At the end of the polymerization, the non-reacted monomers were removed; the polymer was recovered and dried under vacuum at 70° C. for three hours. Then the polymer was weighed and characterized.

Examples 1-9 and Comparative Examples C1-C9: Propylene Polymerization

The phthalate-based solid catalyst components of Examples 1-9 were prepared from spherical adducts $MgCl_2 \cdot pC_2H_5OH$. The phthalate-based solid catalyst component used in comparative examples 1-9 was prepared from a $MgCl_2 \cdot pC_2H_5OH$ but not containing $BiCl_3$. The composition of Examples 1-9 and Comparative Examples 1-9 as well as performance in relation to the propylene polymerization are indicated in Tables 1 and 2.

TABLE 1

Composition of the solid catalyst component

| | Support Synthesis | Support Composition | | Solid Catalyst Component | | | |
|---|---|---|---|---|---|---|---|
| | Bi/Mg % mol | Mg % wt. | Bi % wt. | EtOH/Mg m.r. | Mg % wt. | Ti % wt. | Bi % wt. | DIBP % wt. |
| Ex. 1-9 | 2.7 | 11.2 | 2.6 | 2.3 | 20.0 | 1.0 | 2.2 | 6.9 |
| Comp. Ex. C1-C9 | — | 12.5 | — | 2.2 | 18.6 | — | — | 11.7 |

TABLE 2

Propylene polymerization

| | ED type | $H_2$ feed mL | mileage Kg/g | MIL g/10' | XI % wt. | Mw/Mn | mmmm % wt. |
|---|---|---|---|---|---|---|---|
| Ex. 1 | TEOS | 1500 | 26 | 60 | 97.9 | 5.8 | 95.54 |
| Ex. 2 | TEOS | 3000 | 27 | 150 | 97.7 | 4.7 | 96.65 |
| Ex. 3 | TEOS | 9000 | 28 | 750 | 97.0 | / | / |
| C1 | TEOS | 1500 | 26 | 58 | 95.5 | 6.8 | 94.49 |
| C1 | TEOS | 3000 | 28 | 160 | 96.0 | 4.9 | 95.23 |
| C3 | TEOS | 9000 | 35 | 1000 | 94.2 | / | / |
| Ex. 4 | iBTES | 1500 | 24 | 7 | 98.3 | 5.0 | 97.03 |
| Ex. 5 | iBTES | 3000 | 31 | 23 | 98.3 | 5.0 | 97.70 |
| Ex. 6 | iBTES | 9000 | 46 | 230 | 98.2 | / | / |
| C4 | iBTES | 1500 | 33 | 11 | 96.7 | 5.5 | 95.88 |
| C5 | iBTES | 3000 | 42 | 32 | 97.1 | 4.8 | 96.44 |
| C6 | iBTES | 9000 | 42 | 240 | 97.3 | / | / |
| Ex. 7 | nPTMS | 1500 | 24 | 5.1 | 98.4 | / | / |
| Ex. 8 | nPTMS | 3000 | 25 | 19.6 | 98.2 | / | / |
| Ex. 9 | nPTMS | 9000 | 28 | 130 | 97.2 | / | / |
| C7 | nPTMS | 1500 | 24 | 8.4 | 96.9 | / | / |
| C8 | nPTMS | 3000 | 27 | 24.2 | 96.4 | / | / |
| C9 | nPTMS | 9000 | 32 | 240 | 94.0 | / | / |

Examples 10-12

The phthalate-based solid catalyst components used in examples 1-9 were employed in the copolymerization of propylene with ethylene. The specific conditions relating to hydrogen amount and external donor are reported in Table 3.

Comparative Example 10

The phthalate-based solid catalyst component used in Comparative Examples 1-9 was employed in the copolymerization of propylene with ethylene. The specific conditions relating to hydrogen amount and external donor are reported in Table 3.

Examples 13-14

A glutarate-based solid catalyst component was employed in the copolymerization of propylene with ethylene. The specific conditions relating to hydrogen amount and external donor are reported in Table 3.

TABLE 3

| Example | ED | Hydrogen L | Yield kg/g | C2 % wt | XS % wt | MIL g/10' |
|---|---|---|---|---|---|---|
| 10 | TEOS | 0.8 | 35 | 4.2 | 12.8 | 7 |
| 11 | TEOS | 9.0 | 26 | 3.7 | 11.6 | 600 |
| 12 | IBTES | 9.0 | 54 | 3.9 | 9.1 | 125 |
| C 10. | TEOS | 0.8 | 32 | 3.7 | 16.0 | 8 |
| 13. | TEOS | 9.0 | 39 | 3.5 | 11.3 | 320 |
| 14. | IBTES | 9.0 | 65 | 3.5 | 9.1 | 89 |

What is claimed is:

1. A catalyst for the homopolymerization or copolymerization of $CH_2=CHR$ olefins wherein R is a hydrocarbyl radical with 1-12 carbon atoms, comprising the product obtained by contacting:
   (A) the product obtained by contacting:
      (i) a solid catalyst component comprising
         (a) Ti,
         (b) Mg,
         (c) Cl, and
         (d) an internal electron donor compound selected from the group consisting of ethers, amines, silanes, carbamates, ketones, esters of aliphatic acids, alkyl and aryl esters of optionally substituted aromatic polycarboxylic acids, and diol derivatives selected from the group consisting of monoesters monocarbamates and monoesters monocarbonates and mixtures thereof,
         wherein the solid catalyst component further comprises
         (e) from about 0.1 to about 50 wt % of Bi, based upon the total weight of the solid catalyst component;
      (ii) an alkyl aluminum compound and,
      (iii) an external electron donor compound having the formula:

$Si(OR^2)_4$ wherein $R^2$ is selected from the group consisting of alkyl radicals with 2-6 carbon atoms, optionally containing heteroatoms.

2. The catalyst according to claim 1, wherein the amount of Bi ranges from about 0.5 to about 40 wt %.

3. The catalyst according to claim 1, wherein the Bi atoms derive from Bi halides.

4. The catalyst according to claim 1, wherein the internal electron donor compound is selected from the group consisting of alkyl and aryl esters of optionally substituted aromatic polycarboxylic acids, esters of malonic acids and esters of glutaric acids.

5. The catalyst according to claim 4, wherein the internal donor is selected from alkyl and aryl esters of optionally substituted aromatic polycarboxylic acids, and the Mg/Ti molar ratio is equal to, or higher than, about 13 and the Mg/internal donor molar ratio is higher than about 16.

6. The catalyst according to claim 1, wherein the alkyl aluminum compound (ii) is selected from the group consisting of trialkyl aluminum compounds.

7. The catalyst according to claim 1, wherein $R^2$ is selected from the group consisting of alkyl radicals with 2-4 carbon atoms.

8. The catalyst according to claim 1, wherein the external electron donor compound (iii) is tetraethoxysilane (TEOS).

9. The catalyst according to claim 1, wherein the molar ratio between the alkyl aluminum compound (ii) and the external electron donor compound (iii) ranges from about 0.1 to about 200.

10. A process for the homopolymerization or copolymerization of olefins $CH_2=CHR$, wherein R is a hydrocarbyl radical with 1-12 carbon atoms, optionally in mixture with ethylene, carried out in the presence of a catalyst,
wherein the catalyst comprises
(A) the product obtained by contacting:
(i) a solid catalyst component comprising
(a) Ti,
(b) Mg,
(c) Cl, and
(d) an internal electron donor compound selected from the group consisting of ethers, amines, silanes, carbamates, ketones, esters of aliphatic acids, alkyl and aryl esters of optionally substituted aromatic polycarboxylic acids, and diol derivatives selected from the group consisting of monoesters monocarbamates and monoesters monocarbonates and mixtures thereof,
wherein the solid catalyst component further comprises
(e) from about 0.1 to about 50 wt % of Bi, based upon the total weight of the solid catalyst component;
(ii) an alkyl aluminum compound and,
(iii) an external electron donor compound having the formula:

$$Si(OR^2)_4$$

wherein $R^2$ is selected from the group consisting of alkyl radicals with 2-6 carbon atoms, optionally containing heteroatoms.

11. The process according to claim 10, wherein the process is copolymerization, $CH_2=CHR$ is propylene, propylene copolymers are produced, and the copolymers comprise up to about 40 weight % of a comonomer selected from the group consisting of ethylene and $CH_2=CHR$ olefins other than propylene.

12. The process according to claim 10, wherein the process is homopolymerization, $CH_2=CHR$ is propylene and propylene homopolymers are produced.

13. The process according to claim 10 carried out with a sequential multistage polymerization process.

* * * * *

UNITED STATES PATENT AND TRADEMARK OFFICE
CERTIFICATE OF CORRECTION

PATENT NO. : 10,562,990 B2
APPLICATION NO. : 15/759143
DATED : February 18, 2020
INVENTOR(S) : Piemontesi et al.

It is certified that error appears in the above-identified patent and that said Letters Patent is hereby corrected as shown below:

On the Title Page

Column 1, Item (30), Line 1, delete "15184570" and insert -- 15184570.8 --, therefor Signed and Sealed this
Twenty-fifth Day of October, 2022

Katherine Kelly Vidal
*Director of the United States Patent and Trademark Office*